US010245695B2

(12) United States Patent
Köchl et al.

(10) Patent No.: US 10,245,695 B2
(45) Date of Patent: Apr. 2, 2019

(54) MACHINE TOOL HAVING A CONVEYING DEVICE FOR LEADING AWAY CHIPS

(71) Applicant: DECKEL MAHO PFRONTEN GMBH, Pfronten (DE)

(72) Inventors: Roland Köchl, Vils (AT); Wolfgang Dietenhauser, Waltenhofen (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 0 days.

(21) Appl. No.: 15/544,140

(22) PCT Filed: Jan. 15, 2016

(86) PCT No.: PCT/EP2016/050767
§ 371 (c)(1),
(2) Date: Jul. 17, 2017

(87) PCT Pub. No.: WO2016/113392
PCT Pub. Date: Jul. 21, 2016

(65) Prior Publication Data
US 2017/0368654 A1 Dec. 28, 2017

(30) Foreign Application Priority Data

Jan. 15, 2015 (DE) .................. 10 2015 200 558

(51) Int. Cl.
*B23Q 11/00* (2006.01)
*B23Q 11/10* (2006.01)
*B65G 33/26* (2006.01)

(52) U.S. Cl.
CPC ...... *B23Q 11/0067* (2013.01); *B23Q 11/0057* (2013.01); *B23Q 11/1069* (2013.01);
(Continued)

(58) Field of Classification Search
CPC ... Y10T 409/30392; Y10T 409/303976; Y10T 409/304088; B23Q 11/005;
(Continued)

(56) References Cited

U.S. PATENT DOCUMENTS 5,489,383 A 2/1996 Yoshikawa
5,516,427 A 5/1996 Yoshikawa
(Continued)

FOREIGN PATENT DOCUMENTS

DE 100 41 355 A1 3/2002
DE 20 2004 016 295 U1 1/2005
(Continued)

OTHER PUBLICATIONS

Archimedes' Screw wikipedia document, pp. 1-6, May 22, 2018.*
(Continued)

*Primary Examiner* — Nicole N Ramos
(74) *Attorney, Agent, or Firm* — Oliff PLC

(57) ABSTRACT

A machine tool for machining a workpiece clamped in the working space of the machine tool by means of a tool. The machine tool includes a machine bed, which has a chip collection region having at least one conveying channel open on the working space side for collecting chips that drop during the machining of the workpiece, and a conveying device for leading away chips that have dropped into the chip collection region in the at least one conveying channel. The conveying device has a stationary supporting shaft, which extends in the at least one conveying channel in the longitudinal direction of the conveying channel, wherein a spiral element is rotatably supported on the stationary supporting shaft, and wherein the conveying device also comprises a drive for driving the rotational motion of the spiral element about the stationary supporting shaft.

19 Claims, 10 Drawing Sheets

(52) U.S. Cl.
CPC ........ *B23Q 11/0042* (2013.01); *B65G 33/265* (2013.01); *Y02P 70/171* (2015.11)

(58) Field of Classification Search
CPC . B23Q 11/0057; B23Q 11/10; B23Q 11/0053; B23Q 11/0067; B23Q 11/1069
See application file for complete search history.

(56) References Cited

U.S. PATENT DOCUMENTS

| | | | |
|---|---|---|---|
| 6,364,582 B1* | 4/2002 | Hoppe | B23Q 11/0891 144/251.2 |
| 6,592,306 B2 | 7/2003 | Hoppe et al. | |
| 8,714,535 B2 | 5/2014 | Jung et al. | |
| 2002/0025236 A1 | 2/2002 | Hoppe et al. | |
| 2002/0028118 A1* | 3/2002 | Laur | B23Q 1/70 409/132 |
| 2010/0221082 A1 | 9/2010 | Meidar et al. | |
| 2013/0207331 A1 | 8/2013 | Jung et al. | |
| 2014/0234044 A1* | 8/2014 | Inaguchi | B23Q 11/10 409/136 |
| 2014/0241824 A1* | 8/2014 | Inaguchi | B23Q 11/08 409/137 |

FOREIGN PATENT DOCUMENTS

| | | |
|---|---|---|
| DE | 10 2005 049 020 A1 | 4/2006 |
| DE | 10 2007 044 289 A1 | 3/2009 |
| DE | 10 2012 201 736 B3 | 6/2013 |
| EP | 0 629 427 A2 | 12/1994 |
| EP | 1 182 005 A2 | 2/2002 |
| JP | 2002-103170 A | 4/2002 |
| JP | 2006-75953 A | 3/2006 |
| JP | 2011-25400 A | 2/2011 |

OTHER PUBLICATIONS

Oct. 28, 2015 Office Action issued in German Patent Application No. 10 2015 200 558.5.
Oct. 28, 2015 Search Report issued in German Patent Application No. 10 2015 200 558.5.
Apr. 15, 2016 Written Opinion issued in International Patent Application No. PCT/EP2016/050767.
Apr. 15, 2016 Search Report issued in International Patent Application No. PCT/EP2016/050767.
Aug. 15, 2018 Office Action issued in Japanese Patent Application No. 2017-537430.

* cited by examiner

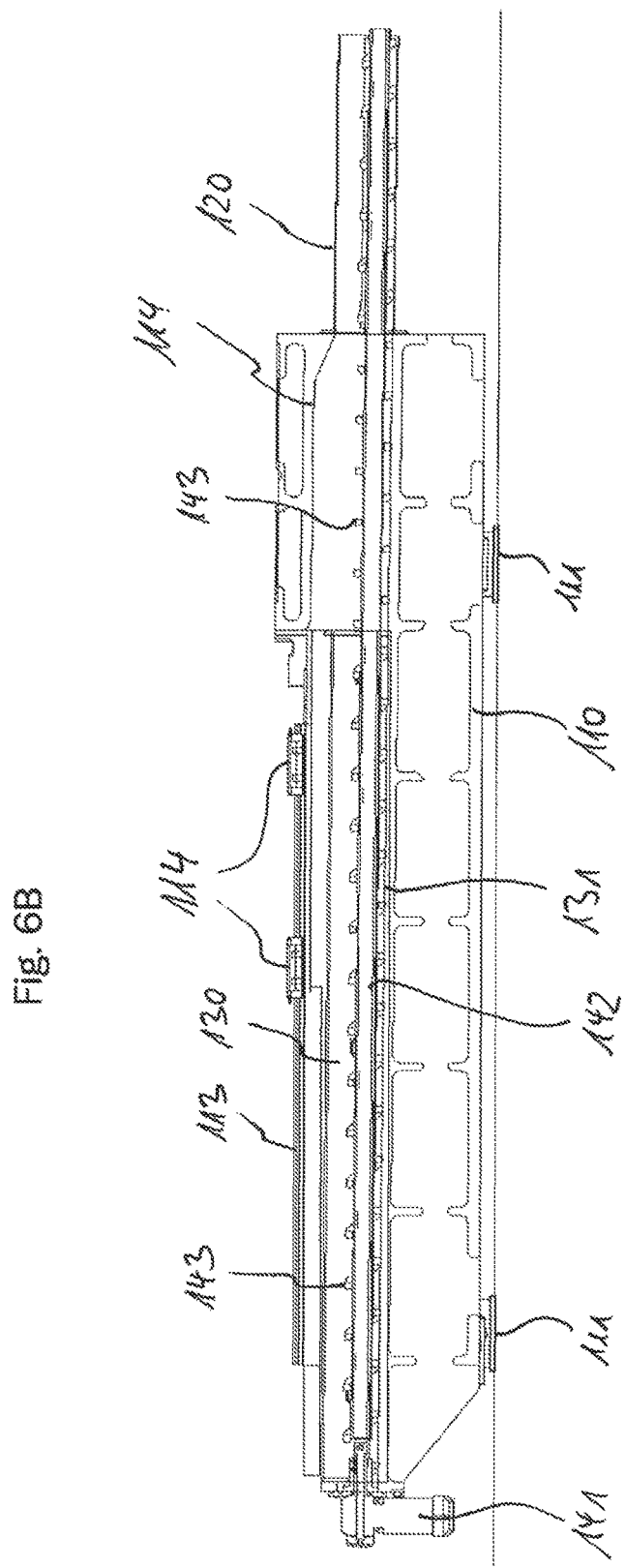

MACHINE TOOL HAVING A CONVEYING DEVICE FOR LEADING AWAY CHIPS

The present invention relates to a machine tool, in particular a numerically controlled machine tool, for machining a workpiece clamped in a working space of the machine tool by means of a tool.

This applies in particular to machine tools, such as milling machines, lathes, milling machines/lathes, lathes/milling machines, all-purpose machine tools, i.e. in particular all-purpose lathes and/or all-purpose milling machines, and machining centers.

The machine tool comprises in particular a machine bed which has a chip collection region or chip collecting space having at least one conveying channel that is open on the side of the working space and serves to collect chips that drop while the workpiece is machined, and a conveying device for leading away chips that have dropped into the chip collection region in the at least one conveying channel.

BACKGROUND OF THE INVENTION

A machine tool of the generic type is known e.g. from DE 10 2012 201 736 A1, which relates to an all-purpose machine tool having a chip collecting space. The exemplary machine tool of the generic type comprises a machine bed of a machine frame, on which a slide, that is guided on linear guideways and has a workpiece table for clamping a workpiece, is guided.

Furthermore, a linearly movable machine stand is guided along a portion of the machine bed where a vertically movable spindle head is guided which has a work spindle for driving a machining tool. The machine bed has a chip collecting space where chips are collected that accumulate when the workpiece clamped on the workpiece fable is machined by means of a tool clamped in the work spindle.

The chip collecting space of the machine tool comprises a conveying channel that accommodates a screw conveyor which is suitable to convey chips collected in the conveying channel in the longitudinal direction of the conveying channel by rotationally driving the screw conveyor. Such a conveying device of a machine tool serves to convey the chips accumulated in the conveying channel of the chip collecting space to an outlet opening of the machine tool where an external or integrated chip conveyor and/or an external or integrated chip conveying device can optionally be provided.

The screw conveyors of such conveying devices for leading away chips at machine tools are usually designed as a single-piece shaped part in the prior art and have an inner shaft portion, around which a spiral section convolves. When the screw conveyor is damaged or broken, it has to be replaced as a whole, and therefore in the maintenance due to damage or destruction of the screw conveyor long machine down times have to be taken into account for the maintenance. In addition, the production of such a screw conveyor is expensive, time-consuming and complex since a heavy cast single part, sometimes of considerable length, has to be produced. Furthermore, a rather large and/or strong drive is required for the rotational motion of the screw conveyor on account of the resulting large mass of the screw conveyor.

On the basis of the above mentioned problems of the prior art, an object of the invention is to provide a machine tool which has a conveying device for leading away chips and, in contrast to the prior art, can be maintained more easily and has a simpler design that requires less maintenance, in particular preferably a lower weight and thus smaller drives.

SUMMARY OF THE INVENTION

In Order to achieve the above mentioned invention, a machine tool according to the independent claim is proposed. Dependent claims relate to preferred embodiments of the invention.

According to an embodiment, a first aspect of the invention proposes a machine tool for machining a workpiece clamped in a working space of the machine tool by means of a tool.

According to the generic type, the machine tool has, in addition to possible further elements of a machine frame, in particular a machine bed which includes a chip collection region or optionally a plurality of chip collection regions, comprising one or more conveying channels that are open on the working space side and serve to collect chips dropping and/or accumulating when the workpiece is processed. The machine tool also comprises in particular a conveying device for leading away chips dropped and/or accumulated at the chip collection region or chip collection regions in the one or more conveying channels.

According to the invention, such a machine tool is in particular characterized in that the conveying device is provided with a stationary supporting shaft which extends in the at least one conveying channel in the longitudinal direction of the conveying channel. Here, the stationary supporting shaft is preferably mounted on or attached to at least one end in a stationary and/or rotationally fixed manner, more preferably in such a way that it cannot be displaced in the conveying channel in the longitudinal direction and/or cannot be rotated about a longitudinal axis. Furthermore, the conveying device is preferably provided with a drive which is configured to drive a rotational motion of a spiral element which is preferably rotatably supported on the stationary supporting shaft.

Here, the basic concept of the invention is in particular that, in contrast to a screw conveyor which is provided in one piece or one part and has an inner shaft portion and an outer spiral portion, a multi-piece structure is provided that is equipped with a stationary supporting shaft which is not driven or does not have to be driven and where a rotatably supported spiral element is supported as an additional element, said spiral element convolving in particular in a spiral fashion about the stationary supporting shaft and/or rotating or being rotationally drivable about the stationary supporting shaft.

The advantage is in particular that, if the spiral element is damaged or broken, it is not the entire screw conveyor that has to be replaced but only a new spiral element is pushed or can be pushed on the existing stationary supporting shaft and/or that, if the supporting shaft is damaged or broken, only the supporting shaft needs to be replaced and the old spiral element can still be used.

In addition, it is easier to produce the sub-elements when such a conveying device and/or the accessories thereof are manufactured, in particular since the stationary supporting shaft can be produced in a very easy way and with low weight, e.g. as a hollow shaft. Due to this, it is also possible to reduce the total weight and in particular to provide a weaker and thus smaller or more efficient drive so as to simplify the conveying device and/or the production thereof and use fewer space-consuming elements or components for the machine tool.

According to an appropriate design of the machine tool, the conveying device is preferably configured, in particular when driving the rotational motion of the spiral element about the stationary supporting shaft, to lead away chips in the at least one conveying channel to a first end portion of the at least one conveying channel. The advantage is that the chips can be led away to the end portion and an optionally adjacent chip conveyor.

Here, the machine tool preferably also comprises at least one discharge opening for leading away chips from the at least one conveying channel, wherein the discharge opening is arranged or can be arranged in particular at the first end portion of the at least one conveying channel.

The advantage is that chips can be led away through the discharge opening and e.g. an external chip conveying device and/or an integrated chip conveyor can be connected to further lead away or collect the chips.

According to a further appropriate design of the machine tool, the drive can be arranged e.g. on a second end portion of the at least one conveying channel which can be arranged on the side of the at least one conveying channel that is opposite the first end portion.

The advantage is in particular that the drive is arranged on a side that is opposite the above mentioned discharge opening such that the drive and the configuration thereof do not impede or affect the discharge of chips, in particular since the chips can be removed from the drive at the second end portion of the at least one conveying channel to the other side of the conveying channel, in particular to the first end portion of the at least one conveying channel.

In further preferred embodiments, the at least one conveying channel can also have a downward angle of inclination, in particular an angle of inclination sloping downwards in relation to the first end portion.

The advantage is that, along with the conveyance of chips by driving the spiral element about the stationary supporting shaft, additionally accumulating coolant and/or lubricant can flow towards the first end portion on account of the downward angle of inclination and can be collected or led away at this end portion or at the drain opening at the first end portion.

In alternative embodiments, the at least one conveying channel can also have an angle of inclination rising towards the first end portion, in particular in such a way that chips can be conveyed towards the first end portion by driving the spiral element about the stationary supporting shaft, whereas coolant and/or lubricant flows off in a direction opposite the chip conveying direction due to the angle of inclination rising towards the first end portion.

In such embodiments, a drain opening for draining lubricant and/or coolant is preferably provided in the at least one conveying channel at a second end portion which is arranged on the side opposite the first end portion. The advantage is that an efficient separation of chips and lubricant and/or coolant can already be carried out in the conveying channel by discharging chips to one side while lubricant and/or coolant flows to the other side due to the angle of inclination.

According to further exemplary designs, the stationary supporting shaft can be supported at least at one of the end portions of the at least one conveying channel, or optionally also at both end portions of the at least one conveying channel.

In further preferred embodiments of the invention, the stationary supporting shaft can also have at least one or also a plurality of superficial groove-shaped recesses which preferably extends or extend in the longitudinal direction of the conveying channel or in the longitudinal direction of the stationary supporting shaft. The advantage is that the stationary supporting shaft surface-wise has a surface structure which extends in the longitudinal direction of the conveying channel and thus provides a directional guide for chips which are conveyed by driving the spiral element and are guided along the groove-shaped recess of the stationary supporting shaft.

In preferred embodiments, the stationary supporting shaft can be made as a hollow shaft. The advantage is that the stationary supporting shaft can be both very stable and rigid and that, because of the design being a the hollow shaft and therefore having a very low weight, this simplifies the production and can also simplify the supports for the stationary supporting shaft since only a low weight has to be supported and, on account of the low weight, it is possible to use space-saving and lighter drives.

The stationary supporting shaft preferably has a substantially circular cross-sectional profile.

The spiral element preferably has, in the longitudinal direction of the al least one conveying channel, a substantially annular profile with a substantially circular outer circumferential profile and/or with a substantially circular inner circumferential profile. In particularly appropriate configurations of the above mentioned designs, an outer diameter of the circular cross-sectional profile of the stationary supporting shaft is preferably smaller than a diameter of circular inner circumferential profile of the spiral element.

The advantage is that a gap is formed between the outer circumference of the cross-sectional profile of the stationary supporting shaft and the inner circumference of the spiral element, as a result of which no friction is created between these two elements when the spiral element is driven about the stationary supporting shaft. Therefore, the drive can be made smaller and more efficient.

In addition, a tolerance is created in the case of small deformations of the spiral element and/or the stationary supporting shaft and/or in the case of an inaccurately axial alignment of the stationary supporting shaft with the spiral element. However, this gap is preferably provided in such a way that it is smaller than an average diameter of the accumulating chips to simplify the discharge of chips and to prevent chips from slipping through or getting stuck between the stationary supporting shaft and the spiral element.

In further preferred configurations, the at least one conveying channel preferably has a substantially cross-sectional profile which has a part-circle shape, at least on a side facing away from the tool space of the machine.

What is preferred here is that an inner diameter of the part circle-shaped cross-sectional profile of the at least one conveying channel is larger than a diameter of the circular outer circumferential profile of the spiral element.

The advantage is that a gap can be provided between the surface of the conveying channel and the spiral element, as a result of which no friction is created when the spiral element is driven without movement with the conveying channel.

Therefore, the drive can be smaller and more efficient and a tolerance is created in the case of slight bendings of the conveying channel and/or the spiral element. Here, too, the gap is preferably smaller than the average diameter of the accumulating chips to prevent chips from slipping through or getting stuck in the gap between spiral element and conveying channel surface.

In further preferred embodiments of the invention, the at least one conveying channel can comprise e.g. a profiled sheet or be configured by a profiled sheet. The advantage is that the production of the conveying device can be made in a simpler and more cost-effective way.

In further preferred designs, the chip collection region can have at least one further conveying channel open on the side of the working space in order to collect chips dropping when the workpiece is machined, wherein the conveying device preferably has at least one further stationary supporting shaft which preferably extends in the at least one further conveying channel, preferably in the longitudinal direction of the further conveying channel, wherein a further spiral element can preferably be rotatably supported on the additional stationary supporting shaft and wherein the conveying device preferably also comprises a further drive for driving the rotational motion of the additional spiral element about the additional stationary supporting shaft.

The advantage is that it is possible in accordance with the above explanations to provide conveying channels with the preferred configuration or preferred configurations of the stationary supporting shaft and/or the spiral element on different sides and/or in various areas of the chip collection region.

The two or more conveying channels of the chip collection region are here preferably arranged in such a way that they extend parallel to one another or extend substantially parallel to one another, in particular in such a way that end portions of the conveying channels with connection openings for external chip conveyors can be arranged on a common side of the machine tool.

BRIEF DESCRIPTION OF THE DRAWINGS

FIGS. 6A and 6B show exemplary schematic longitudinal sections through said part of a machine tool according to FIG. 1.

Figure 1:
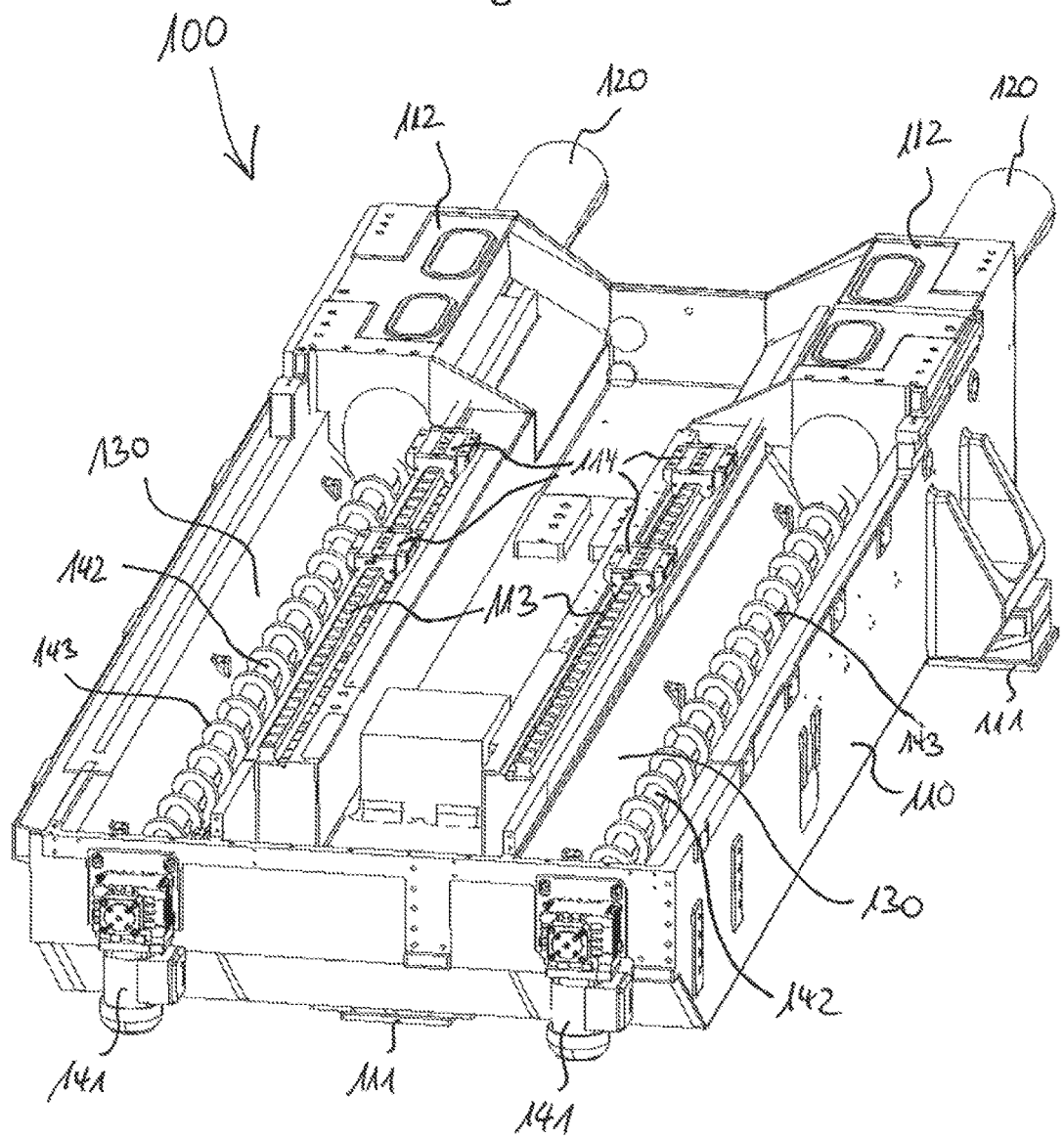
FIG. 1 shows an exemplary schematic perspective view of part of a machine tool with a conveying device for leading away chips according to an embodiment of the invention.

DETAILED DESCRIPTION OF THE DRAWINGS AND PREFERRED EMBODIMENTS OF THE PRESENT INVENTION

Examples of the present invention are described in detail below with reference to the drawings. Equal and/or similar elements in the drawings can here be designated by equal reference signs.

It is pointed out that the present invention is, however, by no means limited to the below described embodiments and the design features thereof but that said invention additionally comprises modifications of the embodiments which are included by modifications of the features of the described examples and/or combination of features of the described examples within the scope of protection of the independent claims.

Figure 2:
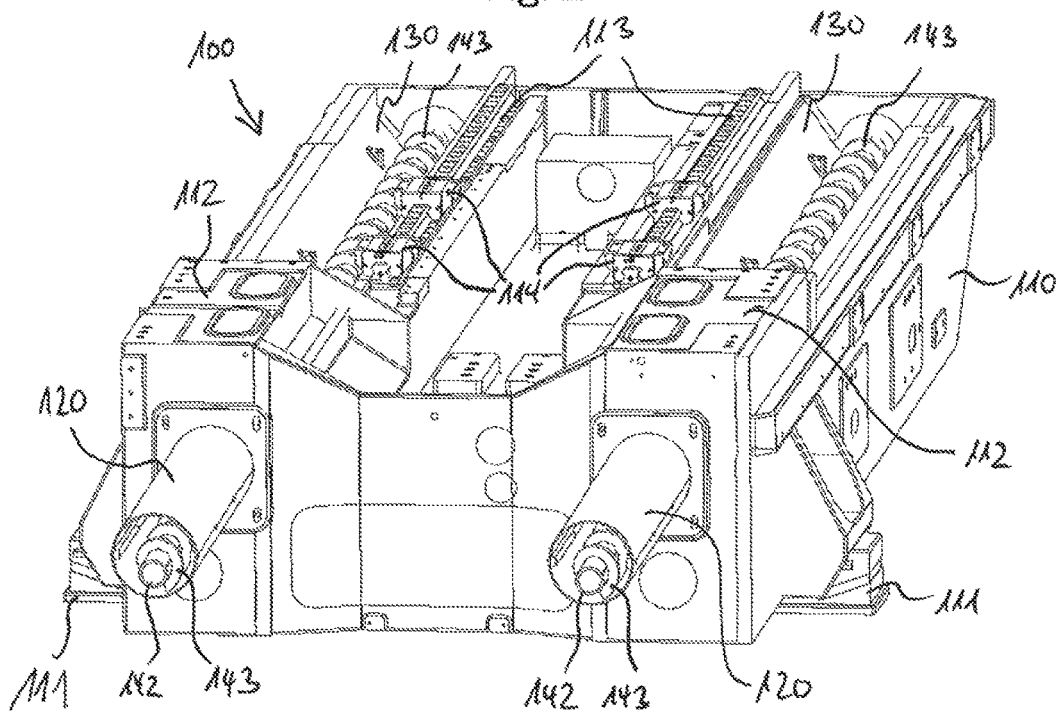
FIG. 2 shows a further exemplary schematic perspective view of said part of the machine tool according to FIG. 1.
Figure 3:
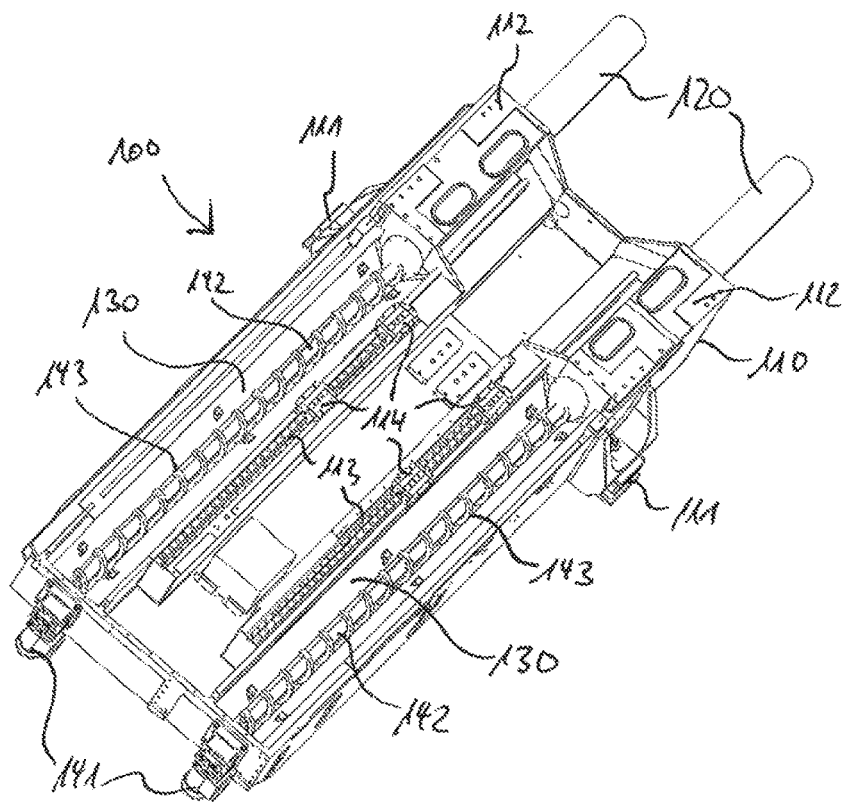
FIG. 3 shows a further exemplary schematic perspective view of said part of a machine tool according to FIG. 1.

FIGS. 1, 2 and 3 show different exemplary schematic perspective views of part of a machine tool 100, in particular of a machine bed 110 of the machine tool 100. For example, the sides or the lower side of the machine bed are provided with pedestals 111, by means of which the machine bed can be set up on a workshop floor in a horizontally aligned fashion.

The machine bed also comprises portions 112, on which e.g. a further (stationary or movable) machine stand can be placed on a finished machine tool 100, e.g. a machine stand for retaining a swivel head, a spindle head or a work spindle of a machine tool.

The machine bed 100 also comprises longitudinal guideways 113 (linear guideways) with guide slides 114, on which e.g. a machine table (e.g. a rotatable revolving table/round table or a stationary tool table) can be retained in order to clamp a workpiece on the machine table. Such a machine table, round table/revolving table or tool table can be linearly moved in the longitudinal direction of the guideways 113 by means of the slides 114 on the linear guideways 113.

According to the embodiment of the present invention, the machine bed 110 also has a conveying device for leading away chips. It is shown here by way of example that two chip collection regions 130 are provided on opposite sides of the linear guideways 113, wherein chips which are formed when a workpiece is machined on the machine tool drop into these chip collection regions 130 where they can be collected.

As an example, each of the chip collection regions 130 has a respective conveying channel 131. See here in particular the top view of FIG. 4 and the cross-sectional view of FIG. 5, which are described below.

In the longitudinal direction of the chip collection region and in the direction of the linear guideways 113, dropped chips are led away to the rear side of the machine tool by means of the conveying device, where the connection openings 120 are arranged.

The respective drives 141 of the conveying device are arranged on the front side of the machine bed 110 by way of example on the end portions of the respective chip collection regions 130.

The conveying device also comprises in each of the collection regions 130 a respective stationary supporting shaft 142, which extends in the longitudinal direction of the respective chip collection region 130 or parallel to the longitudinal direction of the guide railways 113.

Furthermore, a spiral element is rotatably supported on each of the stationary supporting shafts 142 and is preferably designed as one piece from one end portion to the other end portion and encloses or convolves the respective stationary supporting shaft 142 in a helical fashion.

The conveying device is particularly configured to rotate or turn the respective spiral element 143 about the respective stationary supporting shaft 142 by means of the respective drives 141. This is distinguished in particular from previously known conveying devices of the prior art where a full spiral element or a one-piece or one-part screw conveyor was provided which is rotated about an axis of rotation as a whole and comprises both a spiral portion and an inner longitudinal shaft portion as one piece.

Chips collected in the chip collection region 130 are led away from the respective drives 141 and e.g. conveyed to the opposite end portion with the connection openings 120 by driving the respective spiral element 143 about the respective stationary supporting shaft 142 by means of the respective drive 141.

As shown by way of example in FIG. 2, the chips are then removed from the connection portions 120 by the conveying device. It is here possible to provide a further chip conveying device on this side of the machine bed 110, such as an externally connectable chip conveyor according to previously known designs. Such a chip conveying device can in this case be integrated to the machine tool or be provided as a separate device.

Figure 4:
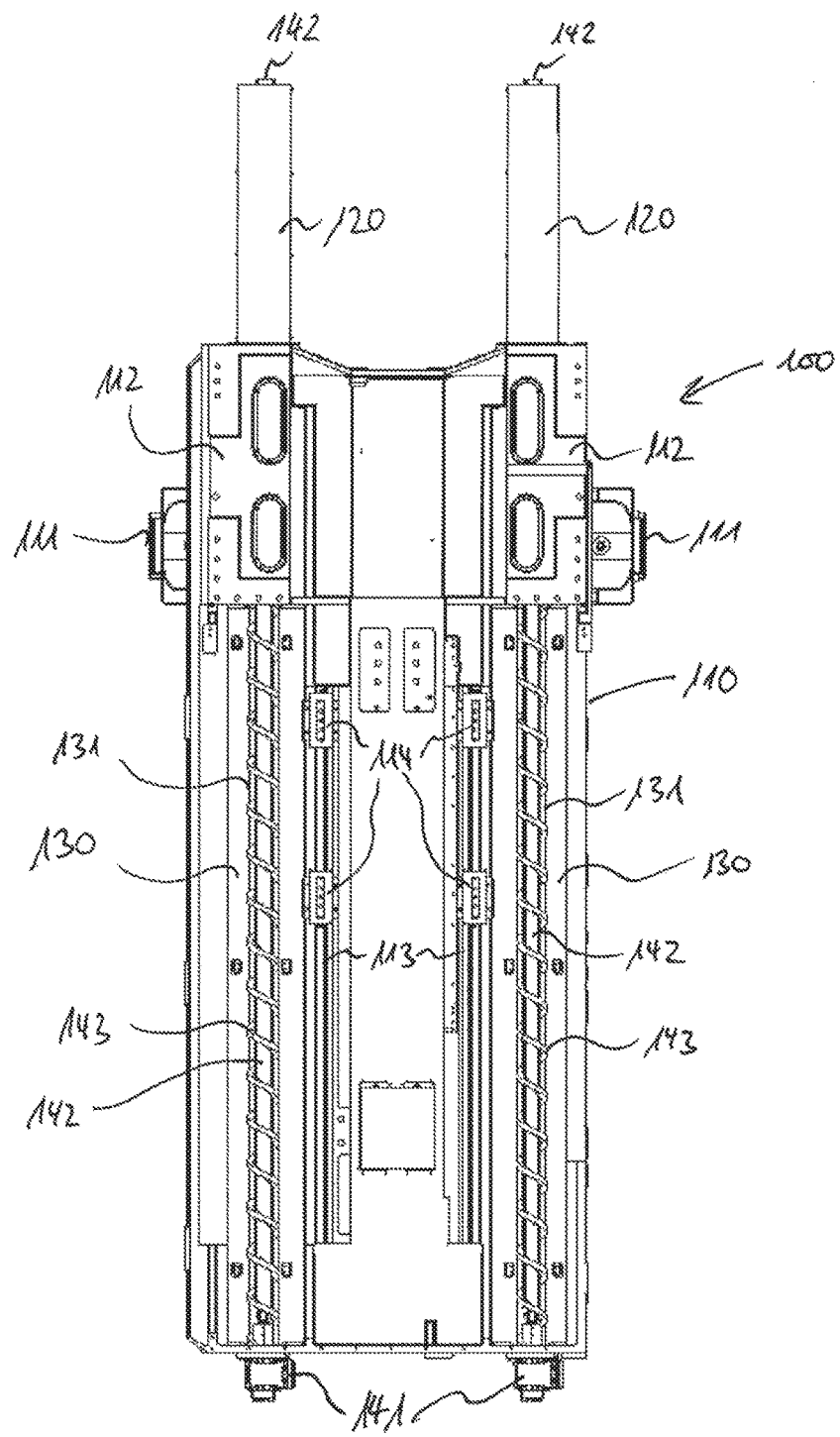
FIG. 4 shows an exemplary schematic top view of said part of a machine tool according to FIG. 1.

FIG. 4 shows an exemplary top view of the machine bed 110 of the machine tool 100 with the conveying device according to the embodiment of the invention according to FIGS. 1 to 3.

It is here shown in particular that the drives 141 are provided by way of example on an opposite side at an end portion of the respective chip collection regions 130 and are opposite the end portion on the other side with the connection openings 120.

It is also shown that the longitudinal directions of the stationary supporting shafts 142 and the longitudinal direction of the conveying channels 131 are aligned e.g. parallel to one another and in particular also e.g. parallel to the guide railways 113 with the linear slides 114. The advantage is that the two exemplary chip collection regions 130 are arranged on opposite sides of the tool table, which can be arranged on the slide 114, and can symmetrically collect chips accumulating on both sides and can lead them away by means of the conveying device.

However, it should be noted that the present invention shall by no means be limited to embodiments having two conveying channels and/or two such conveying devices with supporting shaft 142 and spiral element 143. The present invention also comprises in particular embodiments having only one central or laterally arranged conveying channel 131 with one or more stationary supporting shafts having one or more spiral elements.

Of course, the present invention also comprises embodiments having two or more conveying channels which e.g. can be arranged in parallel pairs and also in pairs which can be arranged transversely or vertically.

Figure 5:
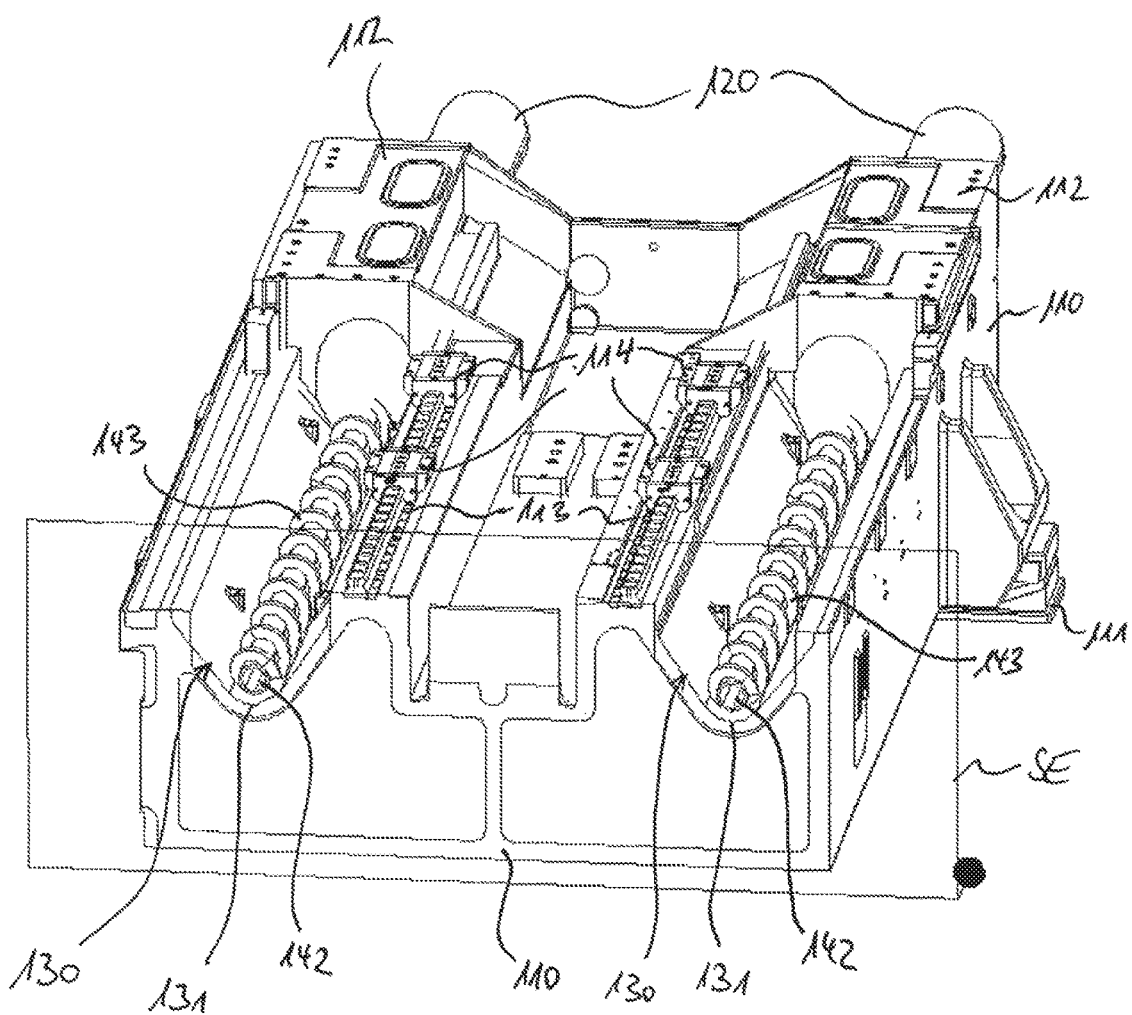
FIG. 5 shows an exemplary cross-sectional view through a machine bed with conveyor device of part of a machine tool according to FIG. 1.

FIG. 5 shows by way of example a cross-sectional view through the machine bed 110 of the machine tool 100 according to FIGS. 1 to 3, wherein in particular the conveying channels 131 of the respective chip collecting spaces or chip collection regions 130 are shown, as well as the supporting shafts 142 which extend in the longitudinal direction therein and have the spiral elements 143 which are rotatably supported about said supporting shafts.

Figure 6A:
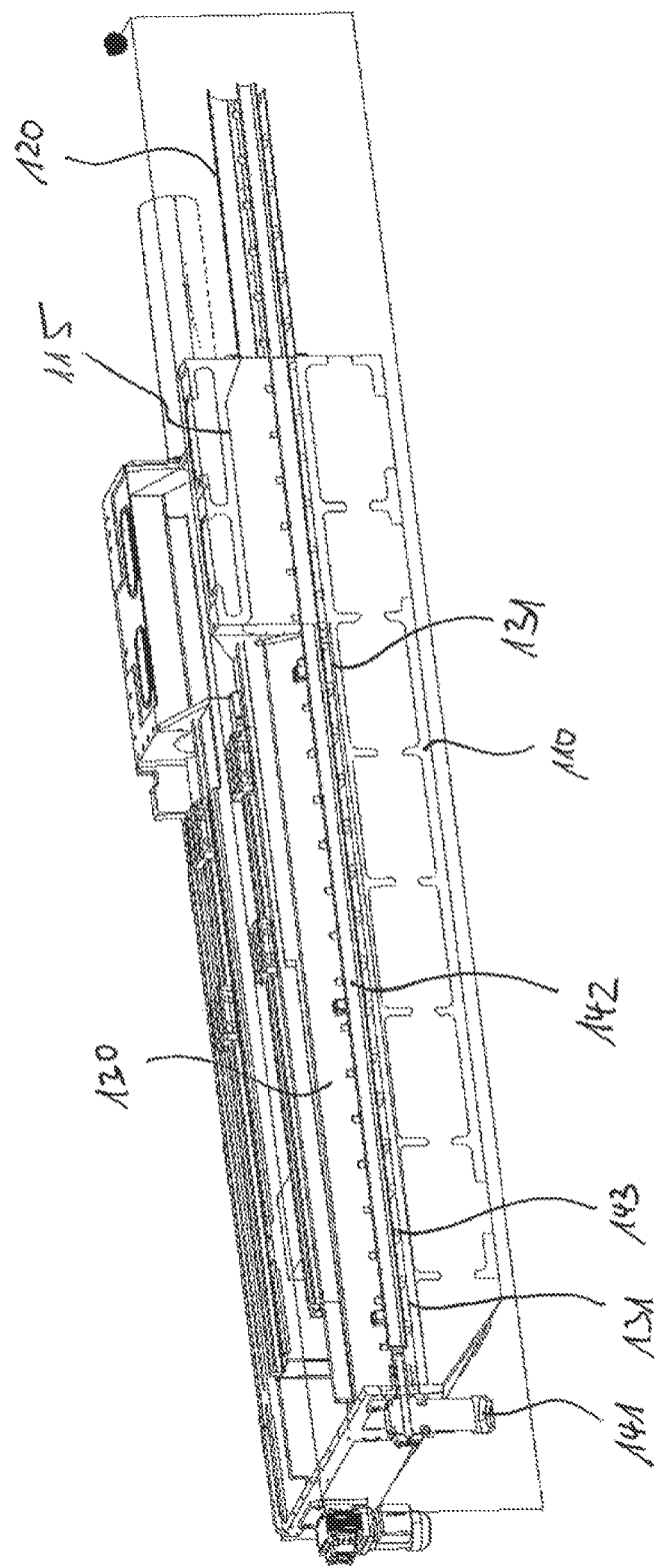

FIGS. 6A and 6B illustrate by way of example longitudinal sections through the machine bed 110, in particular perpendicularly to the cross-section of FIG. 5, wherein the longitudinal section of FIGS. 6A and 6B is in particular also guided through one of the supporting shafts 142.

In particular FIG. 6B shows that the conveying channel 131 has a very small downward angle of inclination, by means of which the conveying channel is inclined from one end portion where the drive 141 is arranged to the other end portion where the connection element and/or the connection opening 120 is arranged. In this embodiment, the downward inclination is about 1%, with angles of inclination of greater than 0° and less than 5° being conceivable.

The result of this downward angle of inclination towards the connection opening 120 is that, in addition to the conveyed chips, coolant and/or lubricant, which is collected in the chip collection regions 130, also flows off towards the connection opening 120 where it can also be collected and optionally reused.

Figure 7A:
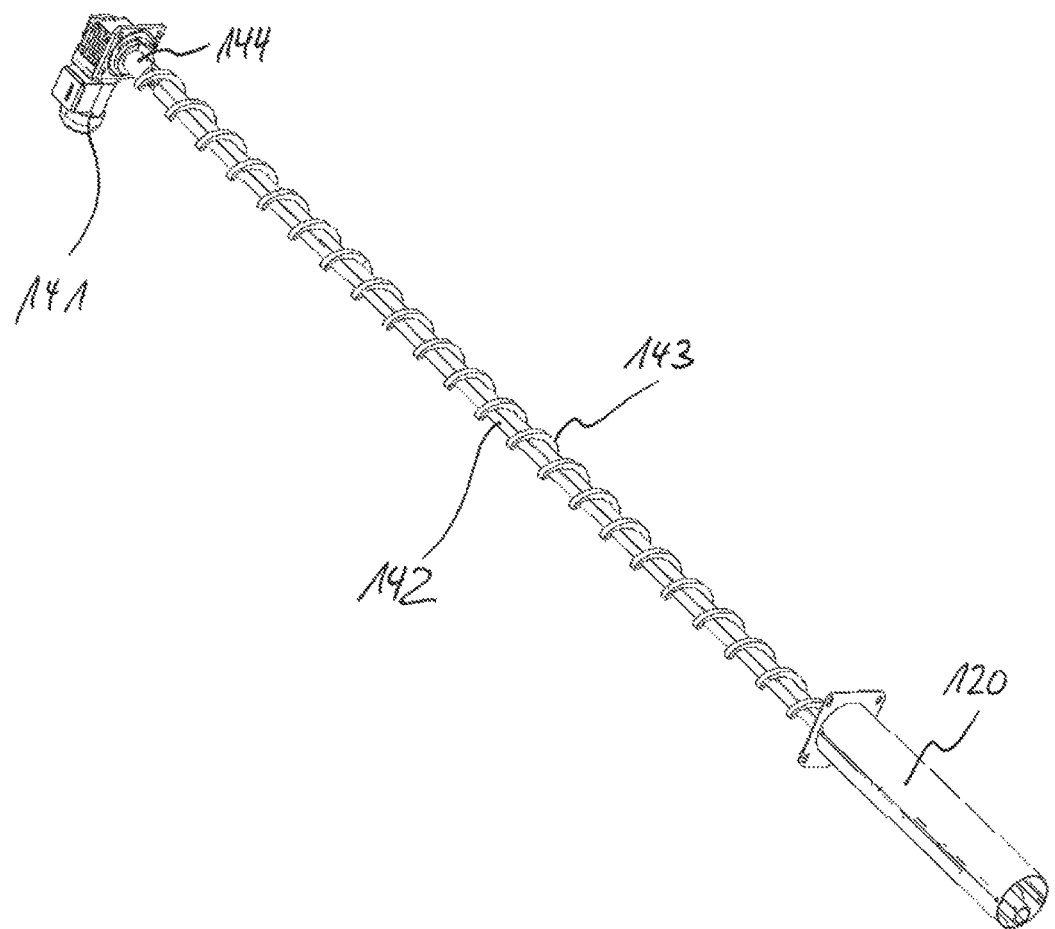
FIGS. 7A and 7B show exemplary schematic perspective views of a conveying device according to an embodiment of the invention.
Figure 7B:
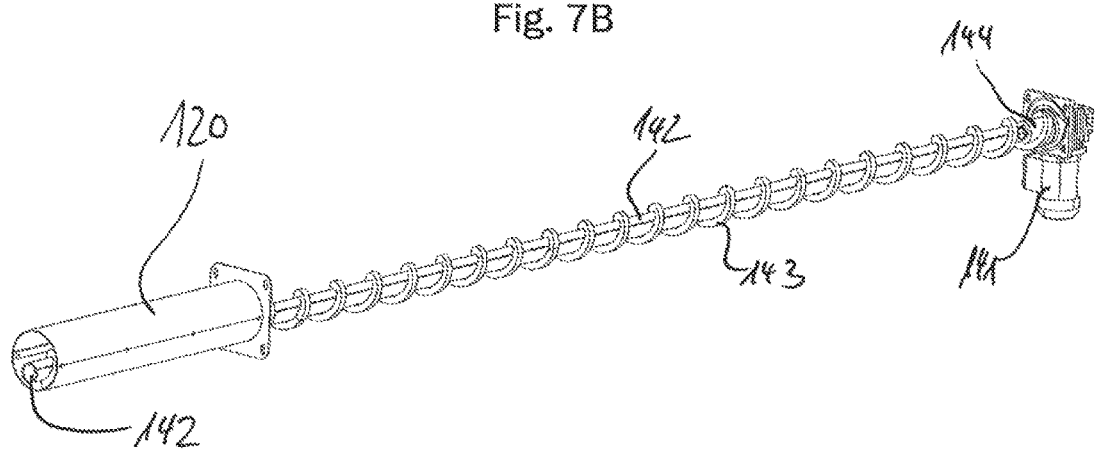

FIGS. 7A and 7B show schematic exemplary perspective views of part of the conveying device according to the embodiment of FIGS. 1 to 3, the drive 141 being shown on one side and the connection element and/or the connection opening 120 on the other side.

In addition, the stationary supporting shaft 142 is shown and extends from one end towards the other end and can be guided in the longitudinal direction of the conveying channel (not shown). The spiral element 143 convolves around the stationary supporting shaft 142 in the form of a spring spiral, wherein the spiral element 143 is rotatably supported on the stationary supporting shaft 142 and can be driven by the drive 141.

For this purpose, the drive 141 is connected via a connection element 144 of the spiral element 143. A helical movement is created by rotatably driving the spiral element 143 by means of the drive 141 about the stationary supporting shaft 142 and conveys the chips away from the drive 141 and towards the connection element and/or the connection opening 120.

Figure 8:
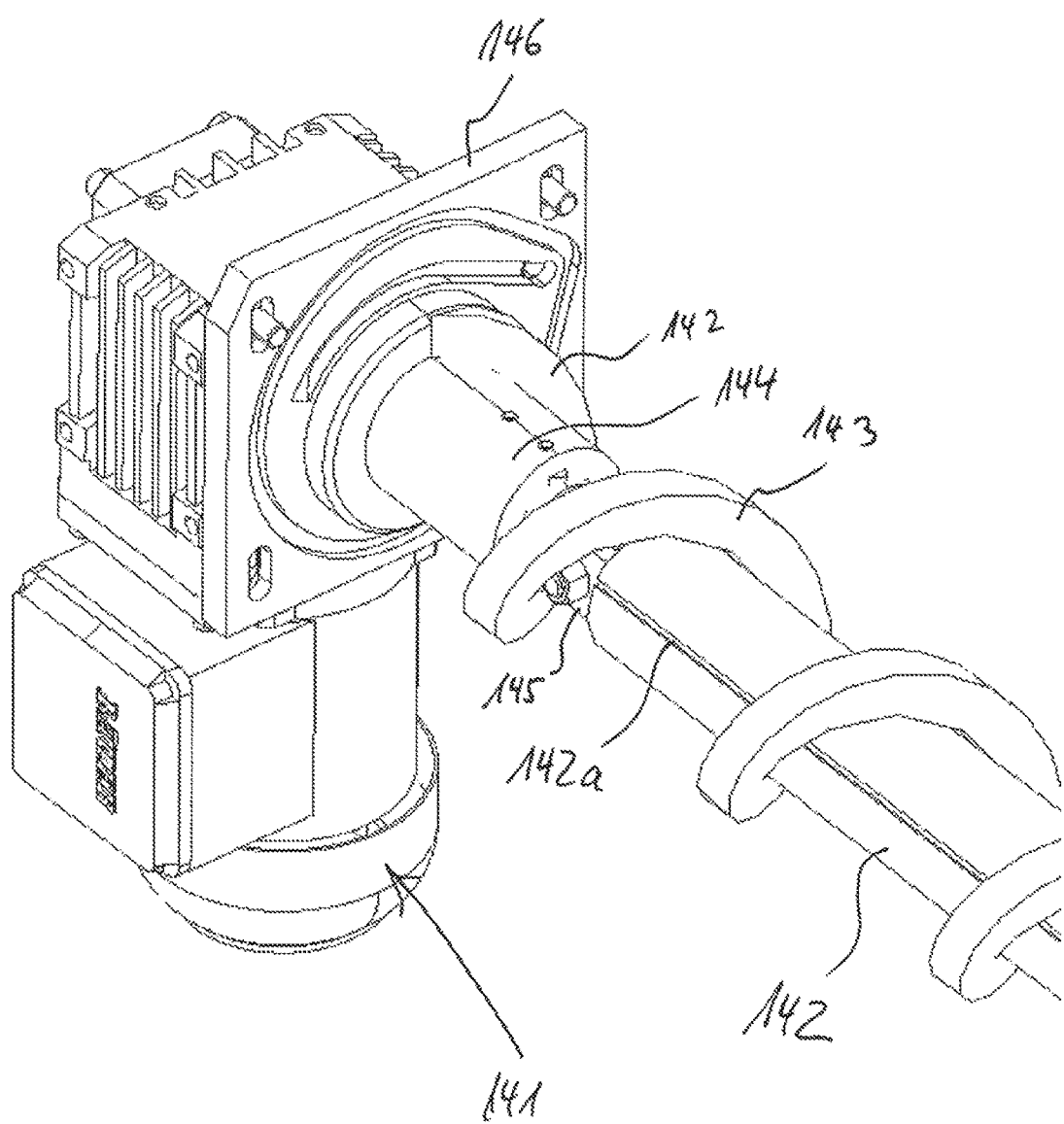
FIG. 8 shows an exemplary schematic perspective view of a drive of a conveying device according to FIGS. 7A and 7B.

FIG. 8 shows a perspective partial view of the drive 141 from FIGS. 7A and 7B, it being shown by way of example that an end of the spiral element 143 is mounted on the connection element 144 or is formed therewith as a shaped element.

FIG. 8 also shows in a detailed view e.g. a groove-shaped recess 142a, which extends in the longitudinal direction on the surface of the stationary supporting shaft 142.

The stationary supporting shaft is supported by means of an attachment element 145, in particular in rotationally fixed fashion in relation to the spiral element 143, such that by rotationally driving the connection element 144 by means of the drive 144 the rotational motion is transmitted to the spiral element 143 in such a way that the spiral element 143 rotates about the longitudinal axis of the stationary supporting shaft 142, wherein the stationary supporting shaft 142 is rotationally fixed and is supported by means of the attachment element 145.

In preferred embodiments, the connection element 144 can here be hollow in its interior to provide for in the interior another attachment element or an attachment which holds the attachment element 145 in FIG. 8 in a rotationally fixed or rotatably fixed fashion.

Figure 9:
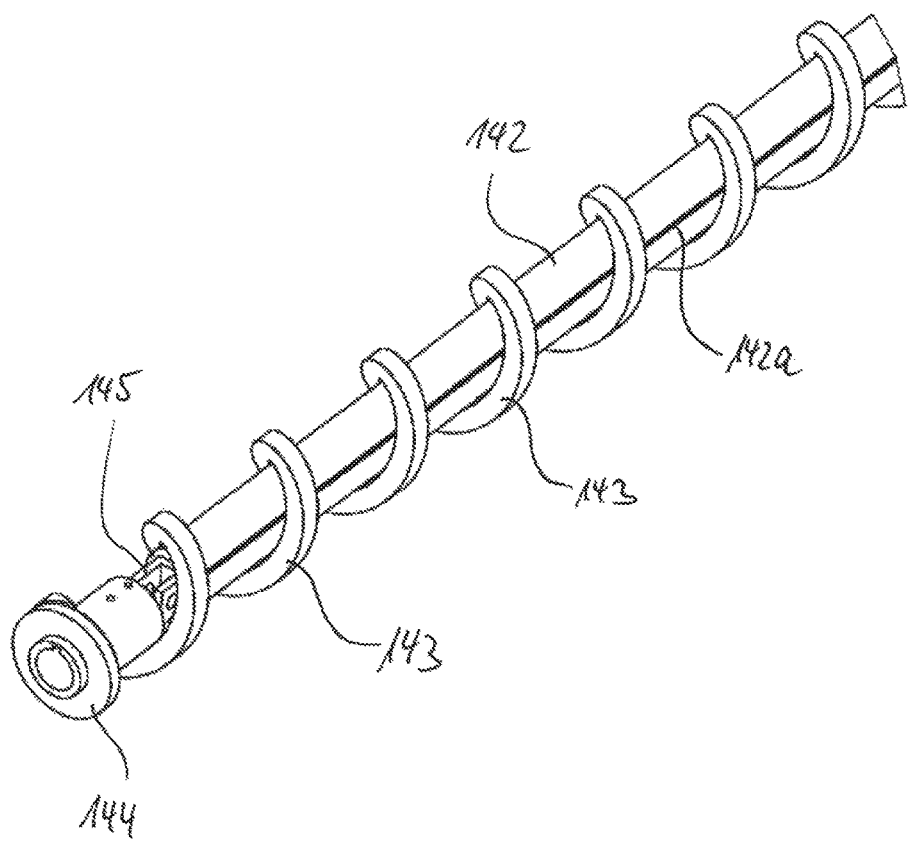
FIG. 9 shows an exemplary schematic perspective view of part of a conveying device according to FIGS. 7A and 73.

FIG. 9 shows an exemplary perspective view of part of the combination of supporting shaft 142 and spiral element 143. Furthermore, the connection element 144 is shown by way of example, to which the spiral element 143 is e.g. attached via an end or which can be made with the spiral element 143 as a single-piece shaped element.

The stationary supporting shaft 142 with the groove-shaped recess 142a extending in the longitudinal direction is guided by way of example inside the spiral element 143 and one end thereof has e.g. an attachment element 145 which is not attached in this state and which can be attached by another attachment element that can be guided through the hollow attachment element 144.

Figure 10:
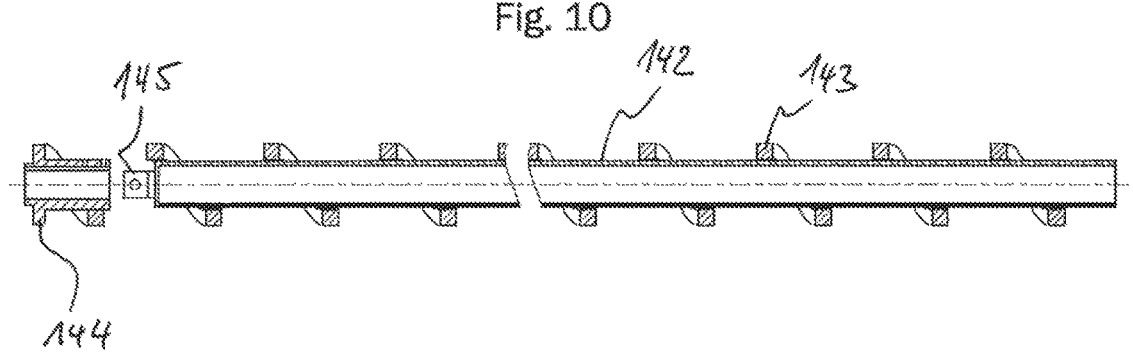
FIG. 10 shows an exemplary schematic longitudinal section of said part according to FIG. 9.

FIG. 10 shows an exemplary longitudinal section through the combination of elements according to FIG. 9, which shows in particular the e.g. hollow configuration of the attachment element 144, by which the attachment element 145 can be attached to one end of the stationary supporting shaft 142 by means of another attachment element. The attachment element 145 is attached e.g. to one end of the stationary supporting shaft 142, it being shown in this longitudinal section according to FIG. 10 that the stationary supporting shaft 142 is made e.g. as a hollow axis.

Figure 11:
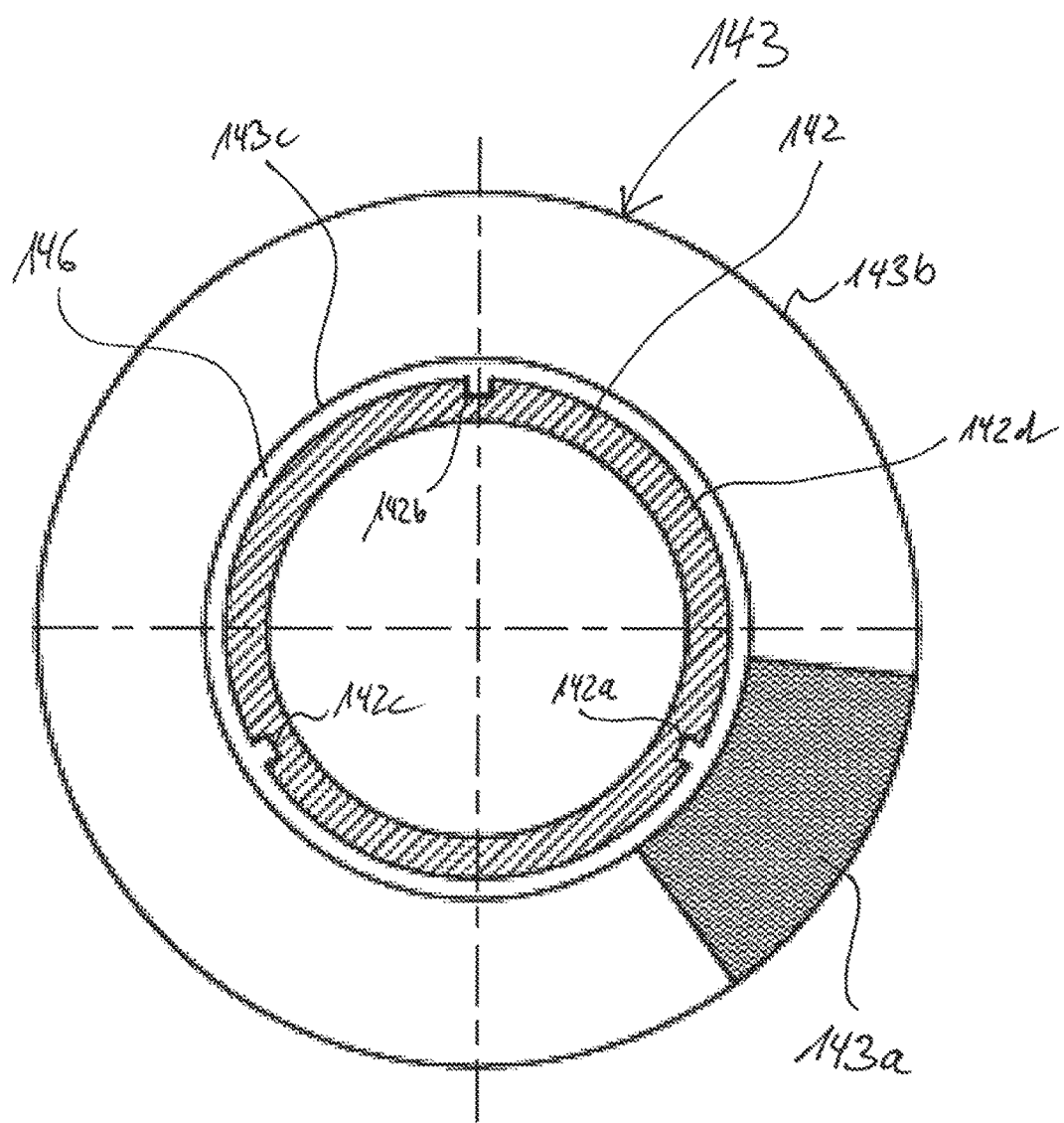
FIG. 11 shows an exemplary schematic cross-sectional view through a part according to FIG. 9.

FIG. 11 shows an exemplary cross-section through the combination of elements according to FIG. 9, it being in particular shown that the stationary supporting shaft 142, which is made as a hollow axis, has e.g. three groove-shaped recesses 142a, 142b and 142c, which extend in the longitudinal direction of the stationary supporting shaft and here form guide recesses for chips conveyed in the longitudinal direction. Of course, exemplary designs having one, two or more than three guide recesses are also conceivable.

The reference sign 143a in FIG. 11 shows a section through the spiral element 143, the profile contours of the spiral element 143 which are disposed outside the sectional plane behind the cutting plane are also shown in a top view in the longitudinal direction of the stationary supporting shaft 142 and/or the spiral element 143.

For example, the spiral element is made in such a way that a top view of the profile in the longitudinal direction of the stationary supporting shaft 142 or of the spiral element 143 is annular, in particular in such a way that e.g. an outer circumference 143b and an inner circumference 143c is formed in a substantially circular fashion.

FIG. 11 also shows by way of example that an outer diameter 142d of the cross-sectional profile of the stationary supporting shaft 142 is also substantially circular, wherein the diameter of the outer circumference of the stationary supporting shaft 142 is smaller than the inner diameter of the profile 143c of the spiral element 143, in particular in such a way that a gap 146 is formed (in particular in circular fashion) between the outer circumference 142d of the stationary supporting shaft 142 and the inner circumference 143c of the spiral element 143 such that the rotation of the spiral element 143 about the stationary supporting shaft 142 occurs with as little friction as possible and therefore only a relatively small drive for driving the rotational motion of the spiral element 143 is sufficient.

However, the gap width of the gap 146 is here preferably smaller than an average chip circumference of the chips accumulating when the workpiece is machined on the machine tool 100, such that the chips do not slip through the gap 146 or get caught or stuck therein.

If a relatively small chip was caught in the gap, it would also be moved on account of the rotational motion of the spiral element 143 about the circumference of the stationary supporting shaft 142 until it reaches one of the groove-shaped recess sections 142a to 142 c, where the wedging or jamming is released again on account of the groove-shaped recess.

The invention claimed is:

1. A machine tool for machining a workpiece, said workpiece being clamped in a working space of the machine tool, the machine tool comprising:
   a machine bed, which has a chip collection region having at least one conveying channel open on a working space side for collecting chips that drop during the machining of the workpiece; and
   a conveying device for leading away chips that have dropped into the chip collection region in the at least one conveying channel, the conveying device including:
   a stationary supporting shaft, which extends in the at least one conveying channel in a longitudinal direction of the at least one conveying channel;
   a spiral element being rotatably supported on the stationary supporting shaft; and
   a drive for driving a rotational motion of the spiral element about the stationary supporting shaft, such that the stationary supporting shaft remains stationary when the spiral element rotates.

2. The machine tool according to claim 1, wherein, when driving the rotational motion of the spiral element about the stationary supporting shaft, the conveying device is configured to lead away chips to a first end portion of the at least one conveying channel.

3. The machine tool according to claim 2, further comprising:
   a discharge opening for leading away chips from the at least one conveying channel, the discharge opening being arranged on the first end portion of the at least one conveying channel.

4. The machine tool according to claim 2, wherein, the drive is arranged on a second end portion of the at least one conveying channel which is arranged on a side of the at least one conveying channel that is opposite the first end portion.

5. The machine tool according to claim 2, wherein, the at least one conveying channel has an angle of inclination sloping downwards towards the first end portion.

6. The machine tool according to claim 2, wherein, the at least one conveying channel has an angle of inclination rising towards the first end portion.

7. The machine tool according to claim 6, wherein, the at least one conveying channel has on a second end portion which is arranged on a side of the at least one conveying channel that is opposite the first end portion, a drain opening for draining at least one of lubricant and coolant.

8. The machine tool according to claim 1, wherein, the stationary supporting shaft is supported at least at one of end portions of the at least one conveying channel.

9. The machine tool according to claim 1, wherein, the stationary supporting shaft has at least one superficial groove-shaped recess which extends in the longitudinal direction of the at least one conveying channel.

10. The machine tool according to claim 1, wherein, the stationary supporting shaft is made as a hollow shaft.

11. The machine tool according to claim 1, wherein, the stationary supporting shaft has a substantially circular cross-sectional profile.

12. The machine tool according to claim 1, wherein, the spiral element has a substantially annular profile with substantially circular outer circumferential profile and/or with substantially circular inner circumferential profile, viewed in the longitudinal direction of the at least one conveying channel.

13. The machine tool according to claim 11, wherein, an outer diameter of the circular cross-sectional profile of the stationary supporting shaft is smaller than a diameter of a circular inner circumferential profile of the spiral element.

14. The machine tool according to claim 1, wherein, the at least one conveying channel has, at least on one side facing away from the working space, a cross-sectional profile which has a substantially part-circle design.

15. The machine tool according to claim 12, wherein,
an inner diameter of a part circle-shaped cross-sectional profile of the at least one conveying channel is larger than a diameter of the circular outer circumferential profile of the spiral element.

16. The machine tool according to claim 1, wherein,
the at least one conveying channel comprises a profiled sheet or is made by a profiled sheet.

17. The machine tool according to claim 1, wherein:
the chip collection region has at least one further conveying channel that is open on the working space side and is designed to collect chips that drop when the workpiece is machined; and
the conveying device includes:
    at least one further stationary supporting shaft, which extends in the at least one further conveying channel in the longitudinal direction of the at least one further conveying channel,
    a further spiral element being rotatably supported on the at least one further stationary supporting shaft; and
    a further drive for driving a rotational motion of the further spiral element about the at least one further stationary supporting shaft.

18. The machine tool according to claim 17, wherein,
the conveying channels of the chip collection region extend parallel to one another.

19. A conveying device for leading away chips that have dropped in to a chip collection region of a machine bed of a machine tool, the machine tool for machining a workpiece that is clamped in a working space of the machine tool, the conveying device comprising:
    a supporting shaft that is capable of being mounted on the machine bed in a stationary fashion;
    a spiral element which, in an installed state, is rotatably supported on the supporting shaft on the machine tool; and
    a drive for driving a rotational motion of the spiral element about the supporting shaft, such that the supporting shaft remains stationary when the spiral element rotates.

\* \* \* \* \*